US010636435B1

(12) United States Patent
Doyle (10) Patent No.: US 10,636,435 B1
(45) Date of Patent: Apr. 28, 2020

(54) ACOUSTIC ECHO CANCELLATION USING LOW-FREQUENCY DOUBLE TALK DETECTION (71) Applicant: Microsemi Semiconductor (U.S.) Inc., Austin, TX (US)

(72) Inventor: Alden J. Doyle, Austin, TX (US)

(73) Assignee: Microsemi Semiconductor (U.S.) Inc., Austin, TX (US)

( * ) Notice: Subject to any disclaimer, the term of this patent is extended or adjusted under 35 U.S.C. 154(b) by 0 days.

(21) Appl. No.: 16/245,217

(22) Filed: Jan. 10, 2019

Related U.S. Application Data (60) Provisional application No. 62/784,441, filed on Dec. 22, 2018.

(51) Int. Cl.
*G10L 21/00* (2013.01)
*G10L 21/0232* (2013.01)
*G10K 11/175* (2006.01)
*H04R 3/04* (2006.01)
*G10L 21/0208* (2013.01)

(52) U.S. Cl.
CPC ........ *G10L 21/0232* (2013.01); *G10K 11/175* (2013.01); *H04R 3/04* (2013.01); *G10L 2021/02082* (2013.01)

(58) Field of Classification Search
CPC . G10L 19/012; G10L 19/028; G10L 21/0208; G10L 2021/02082; G10L 21/0216
USPC .............................................. 381/66, 83, 96
See application file for complete search history.

(56) References Cited

U.S. PATENT DOCUMENTS 6,052,462 A    4/2000  Lu
7,856,098 B1 * 12/2010 Rossello .................. H04B 3/23
                                                                 379/406.08
8,335,319 B2  12/2012 Rahbar
(Continued)

FOREIGN PATENT DOCUMENTS

EP          2822263 A1     1/2015

OTHER PUBLICATIONS

PCT/US2019/042908, International Search Report and Written Opinion of the International Searching Authority, dated Sep. 26, 2019.

*Primary Examiner* — Disler Paul
(74) *Attorney, Agent, or Firm* — Glass and Associates; Kenneth Glass; Kenneth D'Alessandro (57) ABSTRACT

A method for canceling acoustic far-end audio echo content includes high-pass filtering audio content received from a far end and playing the high-pass filtered audio content through a speaker, examining audio content captured by a microphone to detect the presence of audio content in a low-frequency sub band after subtracting high-pass filtered audio content from the audio content captured by the microphone using a least mean square (LMS) adaptive filter. If audio content in a low-frequency sub band is detected in the audio content captured by the microphone, freezing adaptation of the LMS filter and sending to the far end the audio content captured by the microphone after subtracting, and if audio content in a low-frequency sub band is not detected in the audio content captured by the microphone, enabling adaptation of the LMS filter and sending to the far end the audio content captured by the microphone after subtracting.

19 Claims, 6 Drawing Sheets (56) References Cited

U.S. PATENT DOCUMENTS

| | | | |
|---|---|---|---|
| 8,498,407 B2 * | 7/2013 | Mohammad | H04M 9/082 379/406.08 |
| 8,971,543 B1 * | 3/2015 | List | H04R 5/02 381/17 |
| 9,301,048 B2 * | 3/2016 | Sugiyama | G10L 21/0216 |
| 10,014,906 B2 | 7/2018 | Zargar et al. | |
| 10,079,023 B2 * | 9/2018 | Zargar | H04M 9/082 |
| 10,122,863 B2 | 11/2018 | Zargar et al. | |
| 2006/0198511 A1 * | 9/2006 | Su | H04B 3/234 379/406.01 |
| 2007/0019803 A1 | 1/2007 | Merks et al. | |
| 2010/0135483 A1 * | 6/2010 | Mohammad | H04M 9/082 379/406.08 |
| 2017/0092281 A1 * | 3/2017 | Zargar | G10L 19/012 |

* cited by examiner

ACOUSTIC ECHO CANCELLATION USING LOW-FREQUENCY DOUBLE TALK DETECTION

BACKGROUND

The present invention relates to acoustic echo cancellation systems and methods. More particularly, the present invention relates to acoustic echo cancellation systems and methods that employ adaptive filters to estimate the channel from the speaker to the microphone of a device. In addition, a low-frequency band is used to detect near-end voice captured by the microphone.

Double Talk Detection (DTD) is a central problem in Acoustic Echo Cancellation (AEC) systems. The AEC system uses an adaptive filter to estimate the channel from the speaker to the microphone of the device. When the channel estimate is accurate, the system can cancel the echo from the speaker at the microphone. Double talk is a term used to identify a condition where both the device speaker and the near-end user are active at the same time. AEC systems must detect double talk and stop filter adaptation while it is occurring, or stop filter adaption responsive to near-end voice detection, which is always present during double talk.

Furthermore, many AEC systems will squelch the signal from the microphone when the device speaker is active, and the near-end user is inactive. Typically squelching will stop when double-talk is detected, allowing the near-end voice to be transmitted through the system. If the DTD is inaccurate, the squelch will occur at inopportune times. This could result in excessive residual echo or missed voice content.

BRIEF DESCRIPTION

The present invention provides a solution that uses the low-frequency band to detect double talk. It is intended for devices having small speakers, which either cannot produce low frequencies or produce them with so much distortion that they can be filtered out without significantly affecting the intelligibility of the received far-end signal. A high-pass filter is placed on the receive side to remove any low-frequency content.

According to an aspect of the invention, a method for canceling acoustic far-end audio echo content includes high-pass filtering the audio content received from the far end and playing the high-pass filtered audio content through the speaker, examining audio content captured by the microphone to detect the presence of audio content in a low-frequency sub-band after subtracting any high-pass filtered audio content from the audio content captured by the microphone using a least mean square (LMS) adaptive filter, if audio content in a low-frequency sub band is detected in the audio content captured by the microphone, freezing adaptation of the LMS filter and sending to the far end the audio content captured by the microphone after the subtracting, and if audio content in a low-frequency sub band is not detected in the audio content captured by the microphone, enabling adaptation of the LMS filter and sending to the far end the audio content captured by the microphone after the subtracting.

According to an aspect of the invention, examining audio content captured by the microphone to detect the presence of audio content in a low-frequency sub-band includes examining audio content captured by the microphone to detect the presence of audio content in a low-frequency sub-band having a frequency passband below a cutoff frequency of the high pass filtering.

According to an aspect of the invention, the method further includes sending generated comfort noise to the far end in place of the audio content captured by the microphone if far-end audio content was present in the captured near-end audio, and sending to the far end the audio content captured by the microphone if no far-end audio content was captured by the microphone.

According to an aspect of the invention, sending generated comfort noise to the far end in place of the audio content captured by the microphone includes sending generated comfort noise that copies a no-signal level from the microphone and matches spectral content of background noise captured from the microphone.

According to an aspect of the invention, high-pass filtering the far-end audio content includes suppressing the energy in the low-frequency sub band to a level such that the far-end audio echo content in the low-frequency sub band is at a level no higher than the lowest level of background noise expected to be encountered at the microphone.

According to an aspect of the invention, high-pass filtering the audio content received from the far end includes high-pass filtering the audio content received from the far end with a cutoff frequency below 600 Hz.

According to an aspect of the invention the high-pass filtering the audio content received from the far end includes high-pass filtering the audio content received from the far end with a cutoff frequency no higher than 400 Hz.

According to an aspect of the invention, examining audio content captured by the microphone to detect the presence of audio content in a low-frequency sub band includes examining audio content captured by the microphone to detect the presence of audio content in a frequency sub-band of between about 156.25 Hz and about 281.25 Hz.

According to an aspect of the invention, examining audio content captured by the microphone to detect the presence of audio content in the low-frequency sub band further includes estimating the power level of noise in the low-frequency sub band, comparing the power level in the low-frequency sub band to the estimated power level of noise in the low-frequency sub band, and indicating the presence of audio content in the low-frequency sub band if the power level in the low-frequency sub band is higher than the estimated noise power.

According to an aspect of the invention, a system for canceling acoustic echo content in an audio device includes a microphone located at a near end to capture audio content generated at a near end, a speaker located at the near end, a high-pass filter disposed between the far end and the speaker to output high-pass filtered audio content from the far end to be played through the speaker, a bandpass filter coupled to the microphone and having a low-frequency passband below a cutoff frequency of the high-pass filter, a near-end voice detection module coupled to the bandpass filter generating a first signal if audio content captured by the microphone includes audio content in the low-frequency passband of the bandpass filter and generating a second signal if audio content captured by the microphone does not include audio content in the low-frequency passband of the bandpass filter, an adaptive filter arranged to adapt filter coefficients in response to the first signal from the near-end voice detection module and not adapt the filter coefficients in response to the second signal from the near-end voice detection module, a subtracting circuit for subtracting the high-pass filtered audio content passed through the adaptive filter from the audio content captured by the microphone before sending to the far end the audio content captured by the microphone.

According to an aspect of the invention, the system further includes a comfort noise generating circuit, and a switch coupled to the subtracting circuit and to the comfort noise generating circuit and configured to send comfort noise to the far end in response to the second signal from the near-end voice detection module only when high-pass filtered audio content is present and to otherwise send audio content from the subtracting circuit to the far end.

According to an aspect of the invention, the bandpass filter is one of a plurality of bandpass filters disposed in a fast Fourier transform sub-banding circuit, the bandpass filter having a passband including the low frequency passband.

According to an aspect of the invention, the adaptive filter is a least mean square adaptive filter.

According to an aspect of the invention, the high-pass filter is configured to suppress the energy in the low-frequency passband to a level no higher than the lowest level of background noise expected to be encountered at the microphone.

According to an aspect of the invention, the high-pass filter has a cutoff frequency below 600 Hz.

According to an aspect of the invention, the high-pass filter has a cutoff frequency no higher than 400 Hz.

According to an aspect of the invention, the near-end voice detecting circuit of the system includes a circuit to estimate the power level of noise in the low-frequency passband, to compare the power level in the low-frequency passband to the estimated power level of noise in the low-frequency passband, and to indicate the presence of audio content in the low-frequency passband if the power level in the low-frequency passband is higher than the estimated noise power.

According to an aspect of the invention, a system for canceling acoustic echo content in an audio device sending audio captured by a microphone at a near end to a far end and playing audio generated at the far end through a speaker at the near end includes a high-pass filter removing low-frequency content from the audio generated at the far end before playing the audio generated at the far end through the speaker, a low-frequency bandpass filter coupled to the microphone and having a low-frequency passband below a cutoff frequency of the high-pass filter, a near-end active voice detection module responsive to output from the low-frequency bandpass filter, n adaptive filter coupled to the microphone and to the high-pass filter and arranged to adapt filter coefficients only in response to detection of near-end active voice from the near-end voice detection module and otherwise not adapt the filter coefficients, and a subtracting circuit for subtracting audio content passed through the adaptive filter from the audio content captured by the microphone.

According to an aspect of the invention, the high-pass filter is configured to suppress the energy in the low-frequency passband to a level no higher than the lowest level of background noise expected to be encountered at the microphone.

According to an aspect of the invention, the system further includes a comfort noise generating circuit, a switch coupled to the subtracting circuit and to the comfort noise generating circuit and configured to send comfort noise to the far end in response to the second signal from the near-end voice detection module only when high-pass filtered audio content is present and to otherwise send audio content from the subtracting circuit to the far end.

BRIEF DESCRIPTION OF THE DRAWING FIGURES

The invention will be explained in more detail in the following with reference to embodiments and to the drawing in which are shown.

DETAILED DESCRIPTION

Persons of ordinary skill in the art will realize that the following description is illustrative only and not in any way limiting. Other embodiments will readily suggest themselves to such skilled persons.

Figure 1:
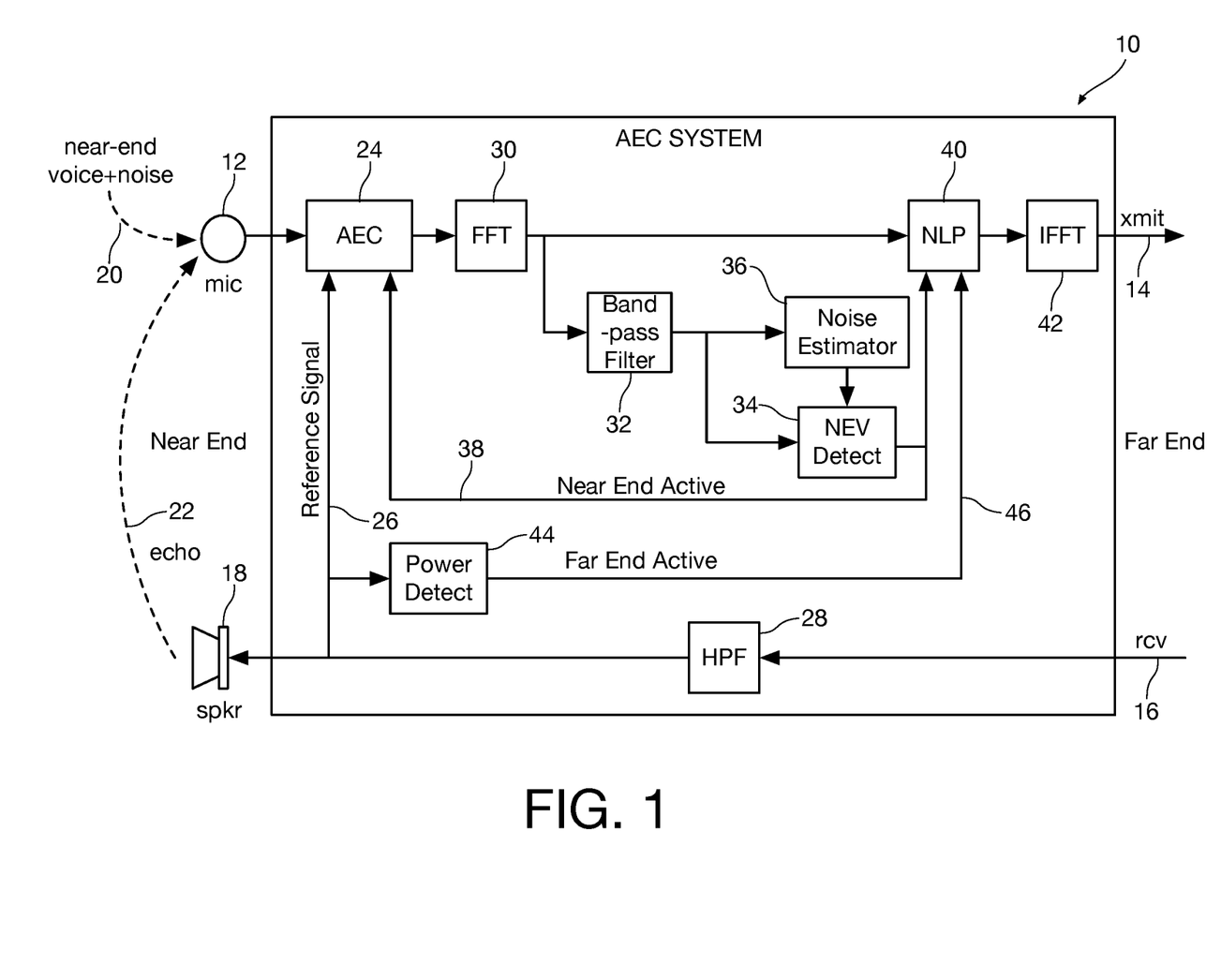
FIG. 1 is a block diagram of an illustrative acoustic echo cancellation system in accordance with an aspect of the invention.

Referring first of all to FIG. 1, a block diagram shows an illustrative acoustic echo cancellation (AEC) system 10 in accordance with an aspect of the invention. Sound captured by a microphone 12 at a "near end" of the system is transmitted to a speaker or other device at a "far end" of the system as indicated by a transmit channel at reference numeral 14. Sound generated either as, for example, a human or machine-generated voice at the far end of the system as represented by a receive channel at reference numeral 16 is received at the near end and played through a speaker 18. In one instance of the invention, the microphone 12 includes an analog-to-digital (A/D) converter (not explicitly shown) to convert the analog signal captured by the microphone 12 to a digital signal. Similarly, the speaker can include a digital-to-analog (D/A) converter (not explicitly shown) to convert the digital signal received on the receive channel 16 from the far end to an analog signal.

The microphone 12 captures both voice and near-end background noise as indicated by reference numeral 20, also known as signal component 20. The microphone also captures an undesirable "echo" signal from the speaker 18 as indicated at reference numeral 22, also called far-end echo 22. The AEC system 10 minimizes or removes the echo component of the sound captured by the microphone 12.

The processing performed by the AEC system 10 is performed in the digital domain. In one illustrative instance of the invention described herein the sample rate can be 16 kHz. A digital signal representing the sound captured by the microphone 12 is passed to AEC module 24. The AEC module 24 compares the input from the microphone 12 with a reference signal on line 26 that originates on the receive channel 16 and has been high-pass filtered in high-pass filter 28. The AEC module 24 minimizes the echo component derived from the signal received from the return channel, i.e. far-end echo 22, from the sound captured by the microphone 12.

The microphone 12 output signal after minimization of the echo component by AEC module 24 is transformed to the frequency domain by fast-Fourier-transform (FFT) module 30. In a non-limiting instance of the invention, the FFT sample size can be 256 samples, with a short-time-FFT overlap of 50%, meaning that each frame is offset 8 ms from the previous frame assuming a sample rate of 16 kHz.

The output of the FFT module 30 is filtered by a bandpass filter 32. The bandpass filter 32 passes a frequency sub-band that is used in the NEV detection module 34 termed "NEV sub-band". In accordance with the present invention, the bandpass filter 32 has a low-frequency passband below a cutoff frequency of the high-pass filter 28. The output of the bandpass filter 32 is also presented to a noise estimator module 36. The estimated noise from the noise estimator 36 is provided to the NEV detector module 34.

The output from the NEV detector module 34 is the near-end active signal on line 38 and is a digital logic signal representing the presence or absence of low frequency near-end voice captured by the microphone 12. In the instance of the invention described herein, the NEV detector module 34 outputs a logic "1" if near-end voice is detected as present in the NEV sub-band and a logic "0" if near-end voice is not detected as present in the NEV sub-band. The near-end active signal is presented to the AEC module 24 as well as to the non-linear processor (NLP) module 40. The output of the NLP module 40 is processed by the inverse FFT (IFFT) module 42, which converts the output of the NLP module 40 back to the time domain and presents the time domain signal to the transmit channel 14 at the far end of the system.

A voice or other audio signal generated at the far end of the system is presented to the receive channel 16 in the digital domain. The signal is filtered by high-pass filter 28 to remove the low frequency component of the signal. The high-pass filter 28 is configured to suppress the energy in the NEV sub bands to a level such that the far-end echo in the NEV sub bands is no higher than the lowest level of background noise expected to be encountered at the microphone 12 and preferably has a cutoff frequency lower than about 600 Hz. In one instance of the invention, the cutoff frequency of the high-pass filter is set to be no higher than about 400 Hz.

The high-pass filtered audio signal from the receive channel 16 is fed to the speaker 18 where it is D/A converted to drive the speaker 18. As previously noted, the high-pass filtered receive channel signal is also used as a reference signal for the AEC module 24. The high-pass filtered receive channel signal is also fed to power detect module 44, which generates a digital logic signal on the far-end active line 46 representing the presence or absence of a signal from the receive channel 16 that is presented to the non-linear processor module 34. In the instance of the invention described herein, the power detect module 44 outputs a logic "1" if a signal from the receive channel is present and a logic "0" if a signal from the receive channel is not present.

The data at the microphone 12 consists of signal component 20, and far-end echo 22. Due to the filtering provided by high-pass filter 28, the far-end echo 22 has minimal low-frequency component. The frequency sub-band passed by the bandpass filter 32 is chosen for processing that is high enough to contain near-end voice, but low enough to contain little or no far-end echo. In one instance of the invention, the sub-band including 156.25-281.25 Hz is passed by the bandpass filter 32 for use in the NEV detector module 34, whereas other sub-bands are not provided to the NEV detector module 34. Preferably the NEV sub-band is selected to comprise at least a portion of the fundamental frequency of typical voiced speech, where the term fundamental frequency is defined as the lowest frequency of a periodic waveform. Voiced speech of a typical adult male has a fundamental frequency from 85 to 180 Hz, and that of a typical adult female from 165 to 255 Hz. The high-frequency end of the chosen NEV sub-band should be within the stop band of the high-pass filter.

The remaining action is to differentiate near-end voice from noise. The sub-band(s) used in the NEV detector module 34 is filtered over time (exponential smoothing) in the NEV detector module 34 and compared to the estimated noise in the NEV sub band from noise estimator 36, whose operation will be described further below, to generate the near-end active signal on line 38. If the filtered power from the NEV detector module 34 exceeds the noise power output by noise estimator 36 by a fixed ratio, then near-end voice is detected and active "1" is output on near-end active signal on line 38. Responsive to the active "1" on the near-end active signal on line 38, the NLP module 40 injects the signal at the output of the FFT module 30 into the data stream fed to the IFFT module 42 regardless of the status of the far-end active signal. If near-end voice is not detected, i.e. the near-end active signal on line 38 is a "0", and far-end voice is detected on the on the far end active line, i.e. the far-end active signal on line 46 is a "1", the NLP module 40 disconnects the output of the FFT module 30 from IFFT module 42, and injects comfort noise into the data stream fed to IFFT module 42. If neither near-end nor far-end voice are detected, i.e. a "0" is output on the near-end active signal on line 38 and a "0" is output on the far-end active signal on line 44, the output of the FFT module 30 is fed as the data stream to IFFT module 42.

As will be appreciated by persons of ordinary skill in the art, the AEC system 10 of FIG. 1 may be implemented in firmware as a DSP system processor that runs on an embedded processor placed in the 2-way voice system in which it is contained.

Figure 2:
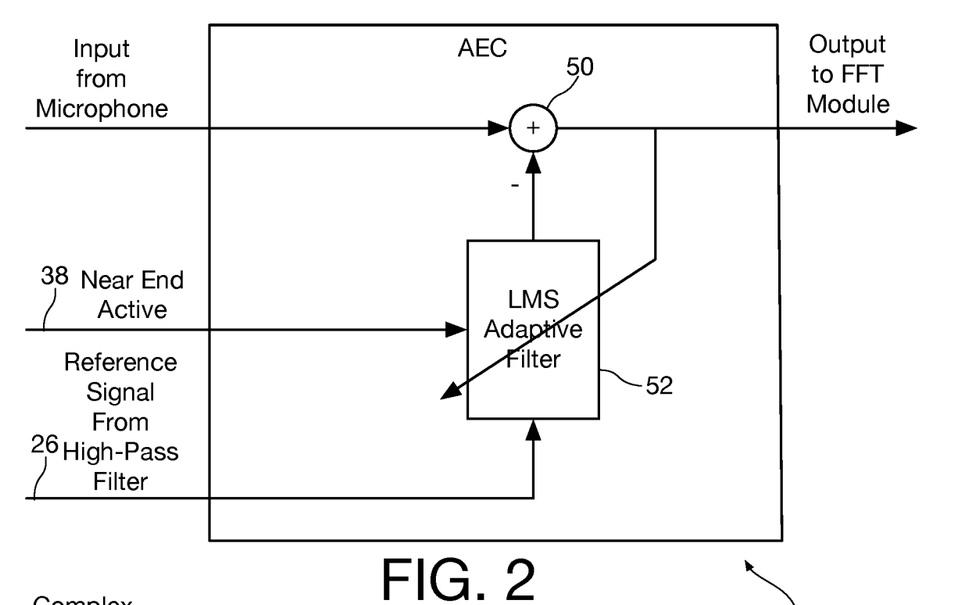
FIG. 2 is a block diagram of an illustrative acoustic echo cancellation module that may be employed in the system of FIG. 1.

Referring now to FIG. 2, a block diagram shows an illustrative acoustic echo cancellation (AEC) module 24 that may be employed in the system of FIG. 1. The input from the microphone 12 is provided to one input of an adder 50. The other input to the adder 50 is the negated output of a least mean square (LMS) adaptive filter 52 having as inputs the near-end active signal from line 38, feedback from the output of the adder 50 and the reference signal on line 26 from the output of high pass filter 28. The LMS adaptive filter 52 applies an FIR filter to the reference signal from the output of high pass filter 28, adapting the FIR filter coefficients to minimize the feedback from the output of adder 50. The filter in combination with the adder 50 has the effect of attenuating (subtracting) the far-end echo 22 portion of the signal captured by the microphone 12, leaving the remaining signal component 20 captured by the microphone 12. The near-end active input from line 38 is used to control the adaptation of the LMS filter. While the near-end is active, adaptation will stop and the FIR filter coefficients will not update.

Figure 3:
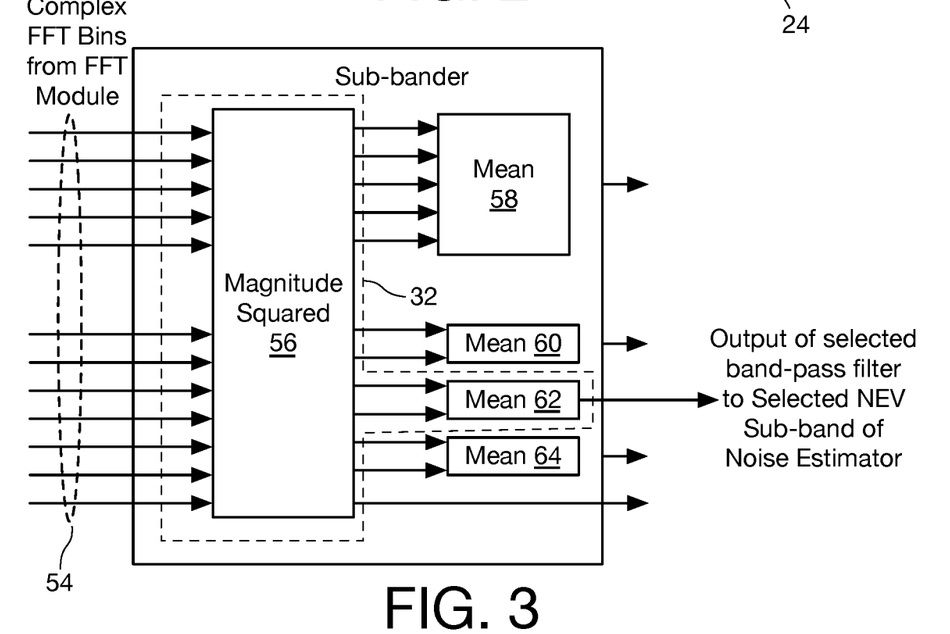
FIG. 3 is a block diagram of an illustrative sub-bander module that may be employed to provide the bandpass filter used in the acoustic echo cancellation system of FIG. 1.

Referring now to FIG. 3, a block diagram shows an illustrative sub-bander module that may be employed to provide the bandpass filter 32 in the acoustic echo cancellation system of FIG. 1. In many typical environments in which the present invention would be employed, other features of a system that includes the acoustic echo cancellation feature of the present invention would utilize the sub-bander to provide output signals for other purposes and so the single bandpass filter 32 used in the present invention is shown in the context of a sub-bander for purposes of illustration.

The sub-bander module squares the magnitudes of the complex FFT bins from the FFT module 30 in magnitude squared unit 56. The mean of the squared values is determined in mean units, representative ones of which are identified by reference numerals 58, 60, 62, and 64. The mean units 58, 60, 62, and 64 each output the mean of the squares of the values of the frequencies within their passbands.

The portion of the sub bander that functions as the single bandpass filter 32 of the present invention is indicated in dashed lines 32 in FIG. 3. The bandpass filter 32 has a low-frequency passband below a cutoff frequency of the high-pass filter 28 of FIG. 1. The output of the bandpass filter 32 is sent to the NEV detector module 34 for processing. Persons of ordinary skill in the art will appreciate that where the present invention is employed in an instance of a simple digital voice system providing only acoustic echo cancellation, a simple bandpass filter 32 having the NEV sub-band as its passband may be provided. Persons of ordinary skill in the art will appreciate that in such a system the FFT module 30 and the IFFT module 42 may be eliminated, the bandpass filter 32 and the NLP module 40 may both be configured to operate in the time domain rather than in the frequency domain.

Figure 4:
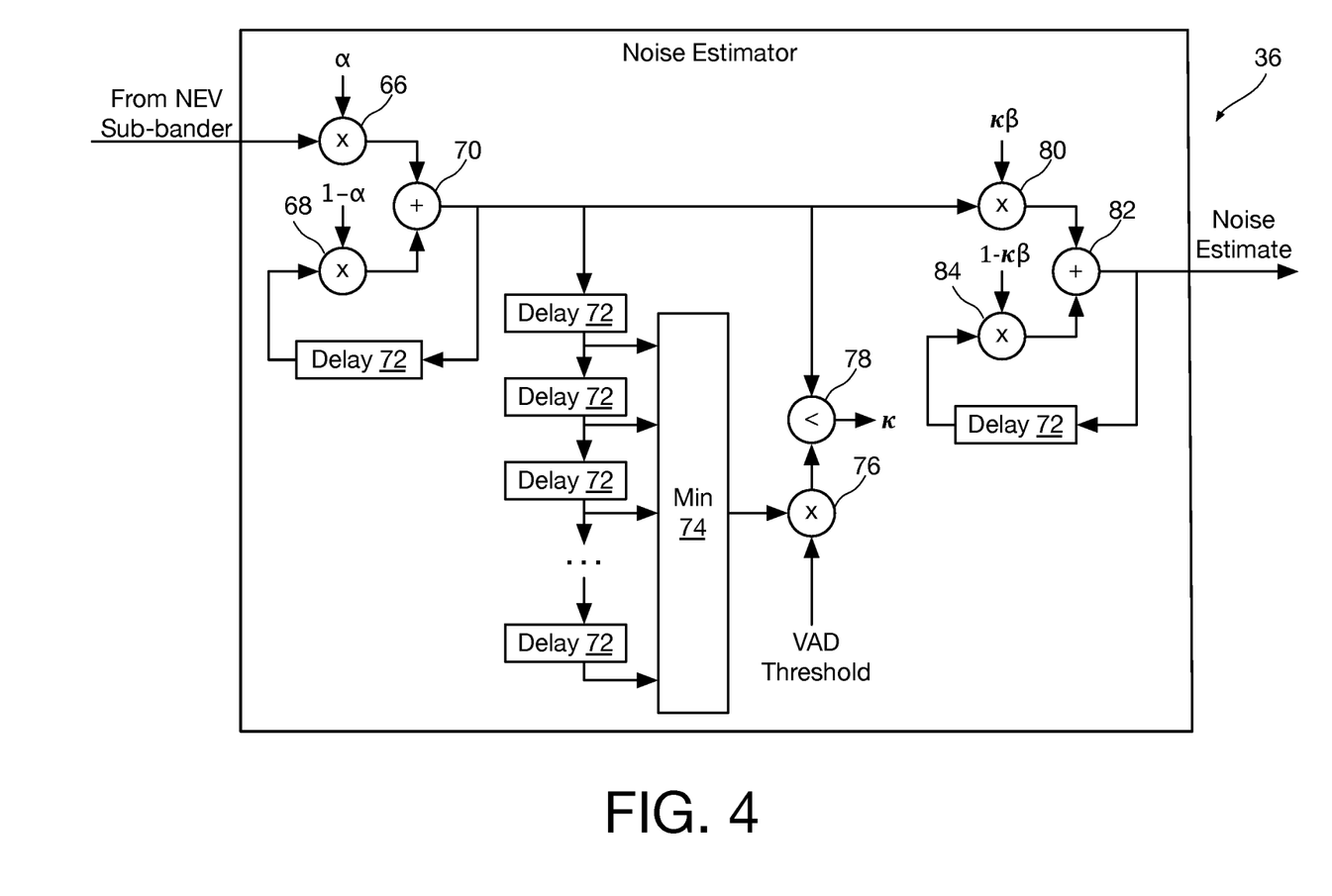
FIG. 4 is a block diagram of an illustrative noise estimator module that may be employed in the system of FIG. 1.

Referring now to FIG. 4, a block diagram shows an illustrative noise estimator module 36 that may be employed in the system of FIG. 1. The noise estimator module 36 estimates the stationary noise in the NEV sub-band. The input to this module is the output from the bandpass filter 32 and represents the power in the chosen sub-band. The output of the noise estimator module 36 is an estimate of the sub-bands noise power. The module begins with an exponential smoothing, which is performed by multipliers 66 and 68, the adder 70, and the delay unit 72. The constant α is the exponential smoothing coefficient. The constant α is chosen empirically based on the variance in the noise power and attempts to reduce the variance in the noise power. In one instance of the present invention the quantity 0.4 is chosen for a. A higher value of a will reduce latency at the expense of accuracy, while a lower value of a will increase accuracy at the expense of latency.

The mean of the squares of the values of the NEV sub-band at the output of the bandpass filter 32 is presented to multiplier 66 where it is multiplied by the constant α. The result output of multiplier 66 is added in adder 70 to a quantity calculated in multiplier 68 from the output of adder 70 delayed by delay unit 72 and multiplied by a constant (1−α) to perform exponential smoothing of the sub band data in order to improve the voice activity detection by reducing the variance of the data.

After the exponential smoothing output by adder 70, a minimum value is found over a fixed window of time. This is a method of establishing a noise floor for the NEV sub-band. Other delay units 72 are cascaded and have their outputs coupled to min circuit 74 that outputs the minimum value. In one instance of the invention there are 125 cascaded delays. The minimum value is multiplied in multiplier 76 with a constant voice-activity detection (VAD) threshold, selected as a threshold above which the incoming data is considered to contain more than noise. The VAD threshold is a ratio of the signal power to the noise power. In one instance of the invention, the VAD threshold is 8. A higher VAD threshold will provide a lower estimation bias (the difference between the expected value and the true value) at the expense of variance of the estimate, while a lower VAD threshold will provide a lower variance of the estimate at the expense of a greater estimation bias. The result of multiplier 76 is compared with the output of adder 70 in less-than circuit 78 that outputs the value K, a logic "1" in the event that the result of adder 70 is less than the output of multiplier 76, indicating that the signal contains only noise, or a logic "0" in the event that the result of adder 70 is not less than the output of multiplier 76, indicating that there is voice and/or echo in the signal.

The value K represents whether or not the noise estimator module 36 will update the previous noise estimate. The update occurs by performing an additional exponential smoothing, which is performed by multipliers 80 and 84, the adder 82, and another delay unit 72. This additional exponential smoothing is performed in order to reduce the variance of the estimate generated by the noise estimator module. The exponential smoothing coefficient is κβ, where β is a constant. The output of adder 68 is multiplied by the constant κβ in multiplier 80. The quantity β is chosen empirically to control the adaptation rate of the noise estimate to achieve a balance between low latency and low variance. In one instance of the present invention the quantity 0.02 is chosen. A higher value of β will reduce latency at the expense of accuracy, while a lower value of β will increase accuracy at the expense of latency. The result is added in adder 82 to a quantity calculated in multiplier 84 from the output of adder 82 delayed by delay unit 72 and multiplied in multiplier 84 by a constant shown as (1−κβ). All of the delays 72 in the noise estimator 36 are equal to one frame in the short-time Fourier transform equaling a time period of 8 mS assuming a 16 KHz clock. The output of adder 82 is the noise estimate for the NEV sub-band fed to NEV detector module 34.

Figure 5:
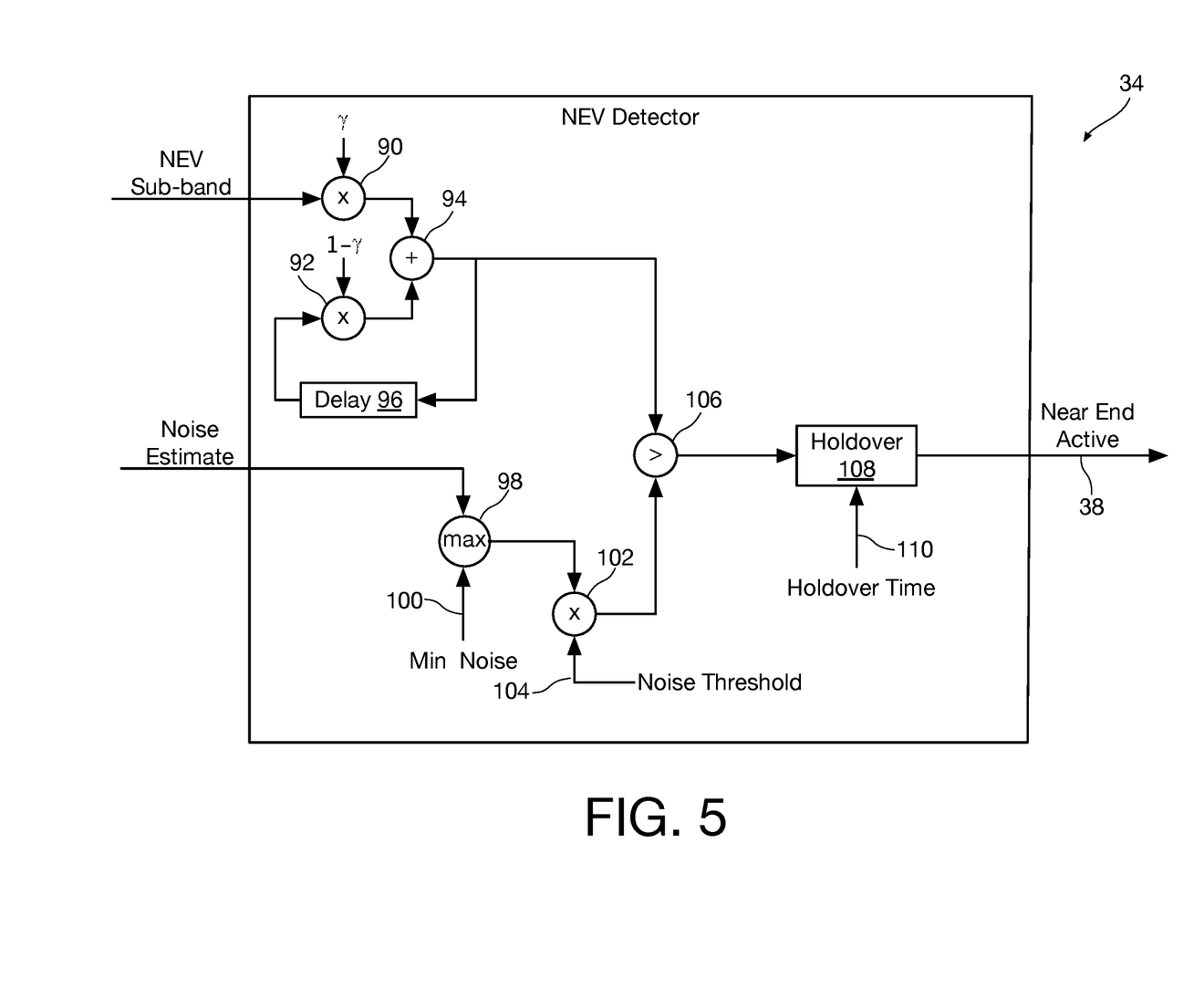
FIG. 5 is a block diagram of an illustrative near-end-voice detection module that may be employed in the system of FIG. 1.

Referring now to FIG. 5, a block diagram shows an illustrative NEV module 34 that may be employed in the system of FIG. 1. The purpose of this module is to detect if a near-end voice is present in the data. This is accomplished by testing if the power in the NEV sub-band is significantly larger than the noise power. The module begins with an exponential smoothing, which is performed by multipliers 90 and 92, an adder 94, and a delay unit 96. The constant γ is the exponential smoothing coefficient. The constant γ, along with a constant noise threshold 104, are chosen empirically based on a preference between false positive and false negative near-end voice detection. In one instance of the present invention the quantity 0.15 is chosen for γ. A higher value for γ results in lower latency at the expense of more false-positive near-end voice detects and a lower value for γ results in fewer false detects at the expense of higher latency. The NEV sub-band that is passed by the bandpass filter 32 is multiplied by a constant γ in multiplier 90. The result is added in adder 94 to a quantity calculated in multiplier 92 from the output of adder 94 delayed by delay unit 96 and multiplied by a constant shown as (1−γ). Delay 96 is one frame in the short-time Fourier transform equaling a time period of 8 mS assuming a 16 KHz clock.

The noise estimate from the noise estimator 36 of FIG. 4 is compared in max unit 98 with a minimum noise quantity shown at reference numeral 100, and max unit 98 outputs the maximum of the minimum noise quantity and the noise estimate from the noise estimator 36. The minimum noise quantity helps prevent false-positive detection during very low-noise conditions. The minimum noise quantity can be set to be just below the lowest expected near-end voice power. This level is preferably the same as the level to which the high-pass filter 28 supresses the low end content of the echo at the microphone. The output of max unit 98 is multiplied in multiplier 102 by the noise threshold shown at reference numeral 104. The noise threshold quantity is a ratio of the signal power to the noise power and is chosen to be 5 in one instance of the invention. A lower noise threshold will yield more correct detects at the expense of more false detects, while a higher threshold will yield fewer false detects at the expense of fewer correct detects. The sum calculated by adder 94 is compared in greater-than unit 106 with the output of multiplier 102. The greater-than unit 106 outputs a logic "1" if the sum calculated by adder 92 is greater than the product calculated in multiplier 102 and a logic "0" if the sum calculated by adder 92 is not greater than the product calculated in multiplier 102. Persons of ordinary skill in the art will appreciate that γ and the noise threshold should be selected jointly to provide optimal performance as they will interact somewhat with each other.

Holdover 108 outputs a logic 1 if the output of greater-than unit 106 has been a logic 1 during the last holdover time shown at reference numeral 110, which in one instance of the invention is chosen to be 200 mS. This holdover accounts for vocal pauses over brief periods of time during which a near-end voice is active but has no content in the NEV sub-band. The output of holdover 108 is the near-end active signal presented on line 34. The output of NEV detector module 34 is responsive to the NEV sub-band, and is thus a low-frequency near-end voice detection. The near end active signal on line 38 is thus an active "1" only when low-frequency near-end voice is detected, which as noted above contains minimal far-end echo due to high pass filter 28.

Figure 6:
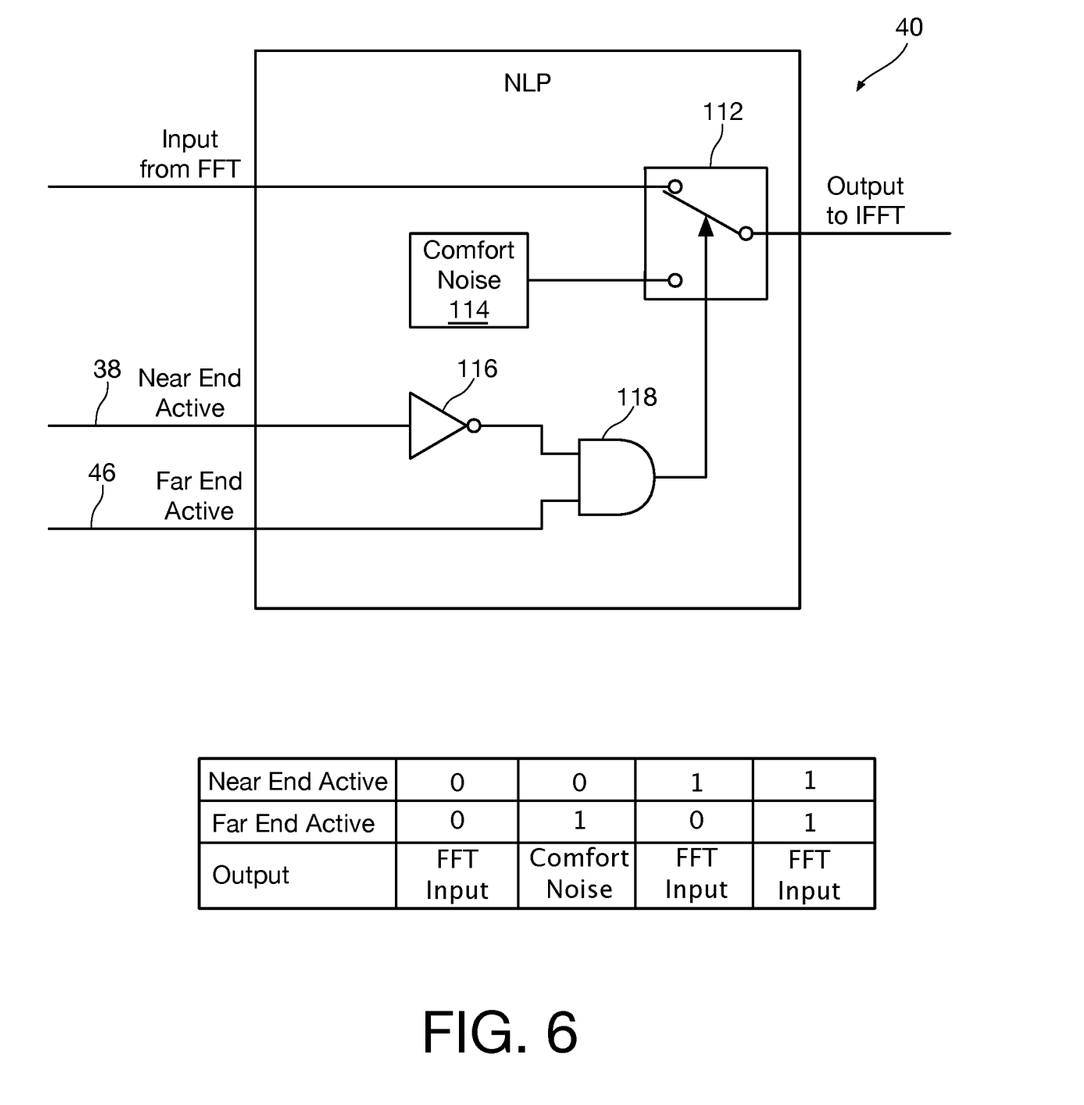
FIG. 6 is a block diagram of an illustrative non-linear processor module that may be employed in the system of FIG. 1.

Referring now to FIG. 6, a block diagram shows an illustrative non-linear processor (NLP) module 40 that may be employed in the system of FIG. 1. The NLP module 40 includes a switch 112, that selects between an input that carries the output of the FFT module 30 and the output of a comfort noise generator 114. The output of the switch 112 is presented to the input of the IFFT module 42.

The switch 112 is controlled by comparing the states of the near-end active line 38 and the far-end-active line 46. The state of the near-end active line 34 is inverted by inverter 116 and the inverted state of the near-end active line 34 and the state of the far-end active line 46 are presented to AND gate 118. If the near-end active line 34 is low and the far-end-active line 46 is high, i.e. a far-end voice signal is present on receive channel 16 and there is no near-end voice signal detected, the switch 112 selects the output from the comfort noise generator 114, thus squelching the signal from the microphone. If the near-end active line 34 is high and the far-end-active line 46 is low, i.e. no far-end voice signal is present on receive channel 16 and the near-end voice signal is detected, the switch 112 selects the output from the FFT module 30. If both the near-end active line 34 and the far-end active line are high (both near-end and far-end voice signals are present), the switch 112 selects the output from the FFT module 30.

Comfort noise generator 114 generates noise that copies a no-signal level from the microphone and matches the spectral content of background noise captured from the microphone. Generation of noise having particular spectral content is well known in the art. Persons skilled in the art will appreciate that comfort noise generator 114 can also generate zero signal level.

The constants α, β, γ, holdover time, and the VAD threshold are typical of a 2-way voice application. The minimum noise level is a linear function of the gain in the A/D conversion.

Figure 7:
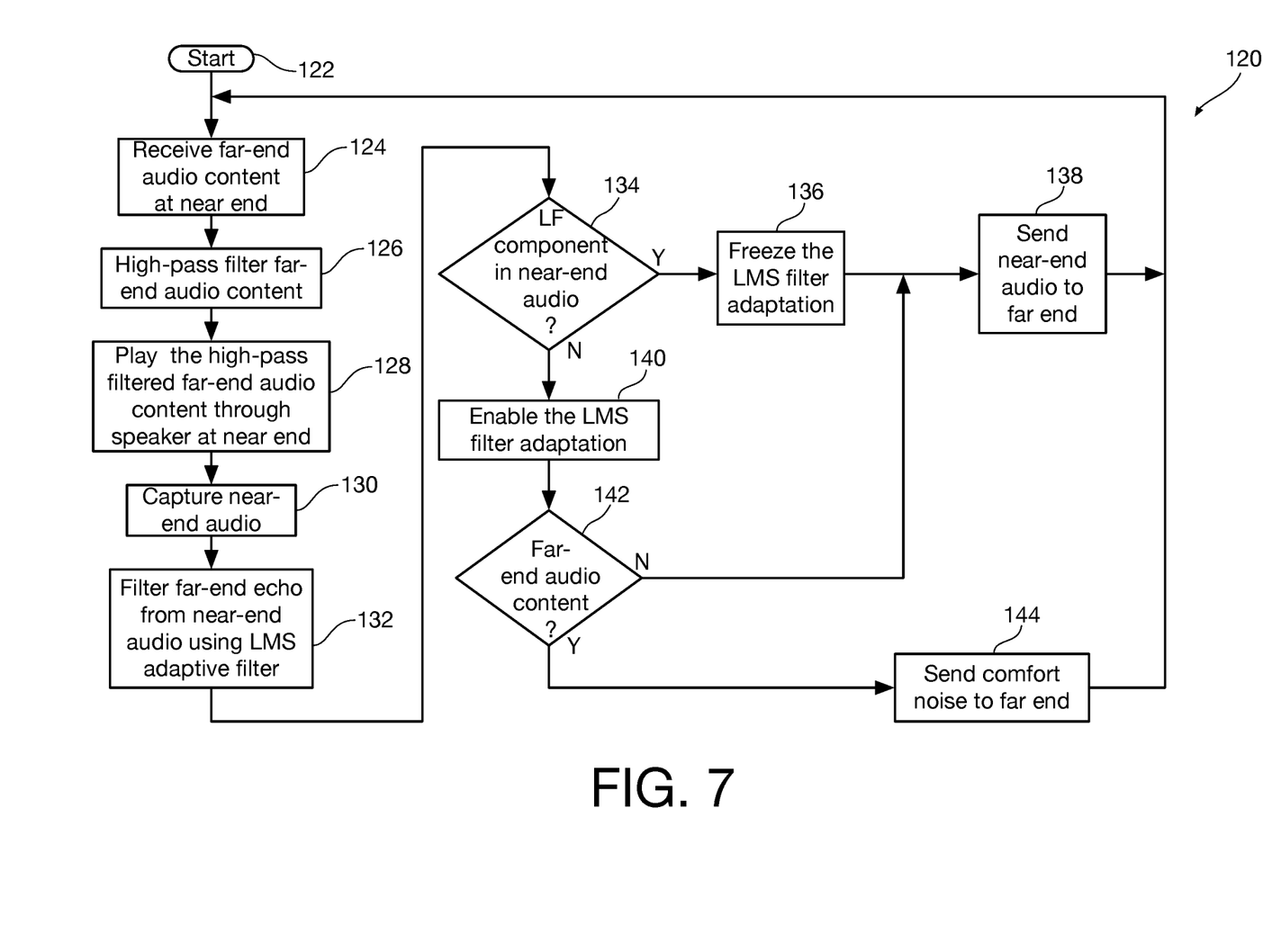
FIG. 7 is a flow diagram showing an illustrative method for acoustic echo cancellation using low-frequency near-end voice detection.

Referring now to FIG. 7, a flow diagram shows an illustrative method 120 for acoustic echo cancellation using low-frequency near-end voice detection in accordance with an aspect of the present invention. The method begins at reference numeral 122.

At reference numeral 124 far-end audio content is received at the near end of the system. At reference numeral 126 the far-end audio content is high pass filtered. At reference numeral 128 the high-pass filtered far-end audio content is played through a speaker at near end of the system.

At reference numeral 130, all near-end audio is captured. This includes any far-end echo audio played through the speaker 24 at reference numeral 128 that has been picked up by the microphone at the near end of the system. At reference numeral 132, any far-end echo is filtered out by the AEC unit 24 of FIGS. 1 and 2.

At reference numeral 134 it is determined if the captured near-end audio includes a low-frequency voice component. If, so, the adaptation of the LMS filter is frozen at reference numeral 136 and at reference numeral 138 the near-end audio (having been stripped of any far-end echo component at reference numeral 132) is sent to the far end of the system. The method then loops back to reference numeral 124.

If at reference numeral 130 it was determined that the captured near-end audio does not include any low-frequency voice component, the adaptation of the LMS filter is enabled at reference numeral 140 and at reference numeral 142 it is determined whether receive channel has an active signal. If not, at reference numeral 138 the near-end audio (having been stripped of any far-end echo component at reference numeral 132) is sent to the far end of the system. The method then loops back to reference numeral 124.

If at reference numeral 142 it was determined that the receive channel does have an active signal at reference numeral 144 comfort noise is sent to the far end of the system. The method then loops back to reference numeral 124.

It is noted that the method described with reference to FIG. 7 is continuous in that it continually loops back to reference numeral 124, either from reference numeral 138 or from reference numeral 144.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. In an audio device capturing and sending to a far end audio content from a microphone located at a near end and playing audio content received from the far end at a speaker located at the near end, a method for canceling acoustic far-end audio echo content comprising:

high-pass filtering the audio content received from the far end and playing the high-pass filtered audio content through the speaker;

examining audio content captured by the microphone to detect the presence of audio content in a low-frequency sub-band, after subtracting any high-pass filtered audio content from the audio content captured by the microphone using a least mean square (LMS) adaptive filter, to detect the presence of audio content in a low-frequency sub-band having a frequency passband below a cutoff frequency of the high pass filtering;

if audio content in the low-frequency sub-band is detected in the audio content captured by the microphone, freezing adaptation of the LMS filter and sending to the far end the audio content captured by the microphone after the subtracting; and if audio content in the low-frequency sub-band is not detected in the audio content captured by the microphone, enabling adaptation of the LMS filter and sending to the far end the audio content captured by the microphone after the subtracting.

2. The method of claim 1 further comprising:

sending generated comfort noise to the far end in place of the audio content captured by the microphone if far end audio content was present in the captured near end audio; and sending to the far end the audio content captured by the microphone if no far end audio content was captured by the microphone.

3. The method of claim 2 wherein sending generated comfort noise to the far end in place of the audio content captured by the microphone comprises sending generated comfort noise that copies a no-signal level from the microphone and matches spectral content of background noise captured from the microphone.

4. The method of claim 1 wherein high-pass filtering the far end audio content comprises suppressing the energy in the low-frequency sub band to a level such that the far end audio echo content in the low-frequency sub band is at a level no higher than the lowest level of background noise expected to be encountered at the microphone.

5. The method of claim 1 wherein high-pass filtering the audio content received from the far end comprises high-pass filtering the audio content received from the far end with a cutoff frequency below 600 Hz.

6. The method of claim 1 wherein high-pass filtering the audio content received from the far end comprises high-pass filtering the audio content received from the far end with a cutoff frequency no higher than 400 Hz.

7. The method of claim 1 wherein examining audio content captured by the microphone to detect the presence of audio content in a low-frequency sub band comprises examining audio content captured by the microphone to detect the presence of audio content in a frequency sub-band of between about 156.25 Hz and about 281.25 Hz.

8. In an audio device capturing and sending to a far end audio content from a microphone located at a near end and playing audio content received from the far end at a speaker located at the near end, a method for canceling acoustic far-end audio echo content comprising:

high-pass filtering the audio content received from the far end and playing the high-pass filtered audio content through the speaker;

examining audio content captured by the microphone to detect the presence of audio content in a low-frequency sub-band, after subtracting any high-pass filtered audio content from the audio content captured by the microphone using a least mean square (LMS) adaptive filter, by estimating the power level of noise in the low-frequency sub-band, comparing the power level in the low-frequency sub-band to the estimated power level of noise in the low-frequency sub-band, and indicating the presence of audio content in the low-frequency sub-band if the power level in the low-frequency sub-band is higher than the estimated noise power.

9. A system for canceling acoustic echo content in an audio device comprising:

a microphone located at a near end to capture audio content generated at a near end;

a speaker located at the near end;

a high-pass filter disposed between the far end and the speaker to output high-pass filtered audio content from the far end to be played through the speaker;

a bandpass filter coupled to the microphone and having a low-frequency passband below a cutoff frequency of the high-pass filter;

a near-end voice detection module coupled to the bandpass filter generating a first signal if audio content captured by the microphone includes audio content in the low-frequency passband of the bandpass filter and generating a second signal if audio content captured by the microphone does not include audio content in the low-frequency passband of the bandpass filter;

an adaptive filter arranged to adapt filter coefficients in response to the first signal from the near-end voice detection module and not adapt the filter coefficients in response to the second signal from the near-end voice detection module; and a subtracting circuit for subtracting the high-pass filtered audio content passed through the adaptive filter from the audio content captured by the microphone before sending to the far end the audio content captured by the microphone.

10. The system of claim 9 further comprising:

a comfort noise generating circuit; and a switch coupled to the subtracting circuit and to the comfort noise generating circuit and configured to send comfort noise to the far end in response to the second signal from the near-end voice detection module only when high-pass filtered audio content is present and to otherwise send audio content from the subtracting circuit to the far end.

11. The system of claim 9 wherein the bandpass filter is one of a plurality of bandpass filters disposed in a fast Fourier transform sub-banding circuit, the bandpass filter having a passband including the low frequency passband.

12. The system of claim 9 wherein the adaptive filter is a least mean square adaptive filter.

13. The system of claim 9 wherein the high-pass filter is configured to suppress the energy in the low-frequency passband to a level no higher than the lowest level of background noise expected to be encountered at the microphone.

14. The system of claim 9 wherein the high-pass filter has a cutoff frequency below 600 Hz.

15. The system of claim 9 wherein the high-pass filter has a cutoff frequency no higher than 400 Hz.

16. The system of claim 9 wherein the near-end voice detection module comprises:

a circuit to estimate the power level of noise in the low-frequency passband, to compare the power level in the low-frequency passband to the estimated power level of noise in the low-frequency passband, and to indicate the presence of audio content in the low-frequency passband if the power level in the low-frequency passband is higher than the estimated noise power.

17. A system for canceling acoustic echo content in an audio device sending audio captured by a microphone at a near end to a far end and playing audio generated at the far end through a speaker at the near end, the system comprising:
- a high-pass filter removing low-frequency content from the audio generated at the far end before playing the audio generated at the far end through the speaker;
- a low-frequency bandpass filter coupled to the microphone and having a low-frequency passband below a cutoff frequency of the high-pass filter;
- a near end active voice detection module responsive to output from the low-frequency bandpass filter;
- an adaptive filter coupled to the microphone and to the high-pass filter and arranged to adapt filter coefficients only in response to detection of near-end active voice from the near end active voice detection module and otherwise not adapt the filter coefficients; and
- a subtracting circuit for subtracting audio content passed through the adaptive filter from the audio content captured by the microphone.

18. The system of claim 17 wherein the high-pass filter is configured to suppress the energy in the low-frequency passband to a level no higher than the lowest level of background noise expected to be encountered at the microphone.

19. The system of claim 17 further comprising:
- a comfort noise generating circuit; and
- a switch coupled to the subtracting circuit and to the comfort noise generating circuit and configured to send comfort noise to the far end in response to the second signal from the near end voice detection module only when high-pass filtered audio content is present and to otherwise send audio content from the subtracting circuit to the far end.

* * * * *